(12) United States Patent
Stevens et al.

(10) Patent No.: US 12,415,610 B2
(45) Date of Patent: Sep. 16, 2025

(54) STRUT ASSEMBLY AND METHOD FOR COUPLING AN ENGINE TO A WING OF AN AIRCRAFT

(71) Applicant: The Boeing Company, Arlington, VA (US)

(72) Inventors: Kyle D. Stevens, Mill Creek, WA (US); Donald T. Powell, Everett, WA (US); Druh Palma, Mill Creek, WA (US); Zachary C. Hoisington, Seal Beach, CA (US)

(73) Assignee: The Boeing Company, Arlington, VA (US)

( * ) Notice: Subject to any disclaimer, the term of this patent is extended or adjusted under 35 U.S.C. 154(b) by 93 days.

(21) Appl. No.: 18/191,937

(22) Filed: Mar. 29, 2023

(65) Prior Publication Data

US 2023/0365247 A1     Nov. 16, 2023

Related U.S. Application Data

(60) Provisional application No. 63/364,636, filed on May 13, 2022.

(51) Int. Cl.
    *B64D 27/40*         (2024.01)

(52) U.S. Cl.
    CPC .................... *B64D 27/402* (2024.01)

(58) Field of Classification Search
    CPC ..................................... B64D 27/402
    See application file for complete search history.

(56) References Cited

U.S. PATENT DOCUMENTS

| | | | | |
|---|---|---|---|---|
| 3,848,832 A | * | 11/1974 | Stanley | B64D 27/18 |
| | | | | 244/54 |
| 4,266,741 A | * | 5/1981 | Murphy | B64D 27/18 |
| | | | | 244/54 |
| 4,458,863 A | * | 7/1984 | Smith | B64D 27/18 |
| | | | | 239/265.29 |
| 5,746,391 A | * | 5/1998 | Rodgers | B64D 27/18 |
| | | | | 248/556 |
| 6,123,293 A | * | 9/2000 | Breitbach | B64D 27/18 |
| | | | | 244/54 |
| 6,126,110 A | * | 10/2000 | Seaquist | B64D 27/18 |
| | | | | 244/54 |
| 7,121,504 B2 | * | 10/2006 | Machado | B64D 27/40 |
| | | | | 244/54 |
| 7,159,819 B2 | * | 1/2007 | Machado | B64D 27/40 |
| | | | | 244/54 |

(Continued)

FOREIGN PATENT DOCUMENTS

| | | | |
|---|---|---|---|
| CH | 713669 A2 | * 10/2018 | |
| FR | 3004420 A1 | * 10/2014 | B64D 27/12 |

*Primary Examiner* — Joseph W Sanderson
(74) *Attorney, Agent, or Firm* — Walters & Wasylyna LLC

(57) ABSTRACT

A strut assembly for coupling an engine to a wing of an aircraft, the strut assembly comprising a mid truss assembly comprising a fore portion and an aft portion; an engine mount member connected to the fore portion of the mid truss assembly; an aft truss assembly comprising a fore portion and an aft portion, the fore portion of the aft truss assembly being connected to the aft portion of the mid truss assembly; an aft strut bulkhead connected to the aft portion of the aft truss assembly; and a wing mounting feature operatively connected to, and located aft of, the aft strut bulkhead.

19 Claims, 7 Drawing Sheets

(56) References Cited

U.S. PATENT DOCUMENTS

| | | | |
|---|---|---|---|
| 7,350,747 B2* | 4/2008 | Machado | B64D 27/406 244/54 |
| 7,740,200 B2* | 6/2010 | Diochon | B64D 27/40 244/54 |
| 7,784,733 B2* | 8/2010 | Diochon | B64D 27/40 244/54 |
| 8,205,825 B2* | 6/2012 | Huggins | B64D 27/40 244/54 |
| 8,382,031 B2* | 2/2013 | Dussol | B64D 27/18 244/54 |
| 9,238,511 B2* | 1/2016 | Woolley | B64D 29/02 |
| 9,868,540 B2 | 1/2018 | Barmichev et al. | |
| 10,144,526 B2* | 12/2018 | Zameroski | G06F 11/3466 |
| 10,562,638 B2* | 2/2020 | Eichstadt | B64D 27/40 |
| 10,899,462 B2* | 1/2021 | Zameroski | B64D 27/40 |
| 11,661,203 B2* | 5/2023 | Horde | B64D 27/402 244/54 |
| 12,103,692 B2* | 10/2024 | Matson | B64D 27/40 |
| 2005/0116093 A1* | 6/2005 | Machado | B64D 27/12 244/54 |
| 2007/0205324 A1* | 9/2007 | Diochon | B64D 27/40 244/54 |
| 2008/0042008 A1* | 2/2008 | Diochon | B64D 27/40 244/54 |
| 2009/0212155 A1* | 8/2009 | Huggins | B64D 27/40 244/54 |
| 2011/0127369 A1* | 6/2011 | Dussol | B64D 27/40 244/54 |
| 2015/0251768 A1* | 9/2015 | Woolley | B64D 27/12 244/54 |
| 2016/0280381 A1* | 9/2016 | Zameroski | B64D 27/40 |
| 2018/0134402 A1* | 5/2018 | Hellegouarch | B64D 27/40 |
| 2019/0009918 A1* | 1/2019 | Zameroski | B64D 27/40 |
| 2019/0270524 A1* | 9/2019 | Eichstadt | B64D 27/40 |
| 2022/0289396 A1* | 9/2022 | Horde | B64D 37/30 |
| 2022/0411084 A1* | 12/2022 | Pome | B64D 27/30 |
| 2023/0192306 A1* | 6/2023 | Matson | B64D 27/402 244/54 |

* cited by examiner

STRUT ASSEMBLY AND METHOD FOR COUPLING AN ENGINE TO A WING OF AN AIRCRAFT

PRIORITY

This application claims priority from U.S. Ser. No. 63/364,636 filed on May 13, 2022.

FIELD

The present disclosure is generally related to and, more specifically, to strut assemblies and associated methods for coupling an engine to a wing of an aircraft.

BACKGROUND

Typical structures for mounting engines to wings of aircraft incorporate a design wherein the strut box sits on top of the engine. This strut box typically attaches to the engine in two locations, generally on the engine fan case and on the turbine rear frame. Because the strut box is on top of the engine, the engine generally has to be shifted downward to accommodate structural height clearance. Further, engine bending is problematic and commonly observed in that it drives stiffness and weight into engines because the thrust is reacted off of the engine centerline.

Accordingly, those skilled in the art continue research and development in the field of coupling engines to wings of aircraft and associated methods for coupling engines of wings to aircraft.

SUMMARY

Disclosed are strut assemblies for coupling an engine to a wing of an aircraft.

In an example, the strut assembly includes a mid truss assembly comprising a fore portion and an aft portion, an engine mount member connected to the fore portion of the mid truss assembly, an aft truss assembly comprising a fore portion and an aft portion, the fore portion of the aft truss assembly being connected to the aft portion of the mid truss assembly, an aft strut bulkhead connected to the aft portion of the aft truss assembly, and a wing mounting feature operatively connected to, and located aft of, the aft strut bulkhead.

Also disclosed is an aircraft.

In an example, the aircraft includes a wing, an engine located below the wing, a strut assembly coupling the engine to the wing, the strut assembly includes a mid truss assembly, an aft truss assembly connected to the mid truss assembly, an aft strut bulkhead connected to the aft portion of the aft truss assembly, wing mounting features located aft of the aft strut bulkhead, and an engine mount member connected to a fore portion of the mid truss assembly.

Also disclosed is a method for connecting an engine to a wing of an aircraft.

In an example, the method includes positioning a strut assembly between the engine and the wing. The strut assembly includes a fore truss assembly, a mid truss assembly connected to the fore truss assembly, an aft truss assembly connected to the mid truss assembly, an aft strut bulkhead connected to the aft portion of the aft truss assembly, wing mounting features located aft of the aft strut bulkhead, and an engine mount member connected to the fore truss assembly.

Other examples of the disclosed strut assemblies, aircraft, and methods will become apparent from the following detailed description, the accompanying drawings, and the appended claims.

DETAILED DESCRIPTION

Figure 1:
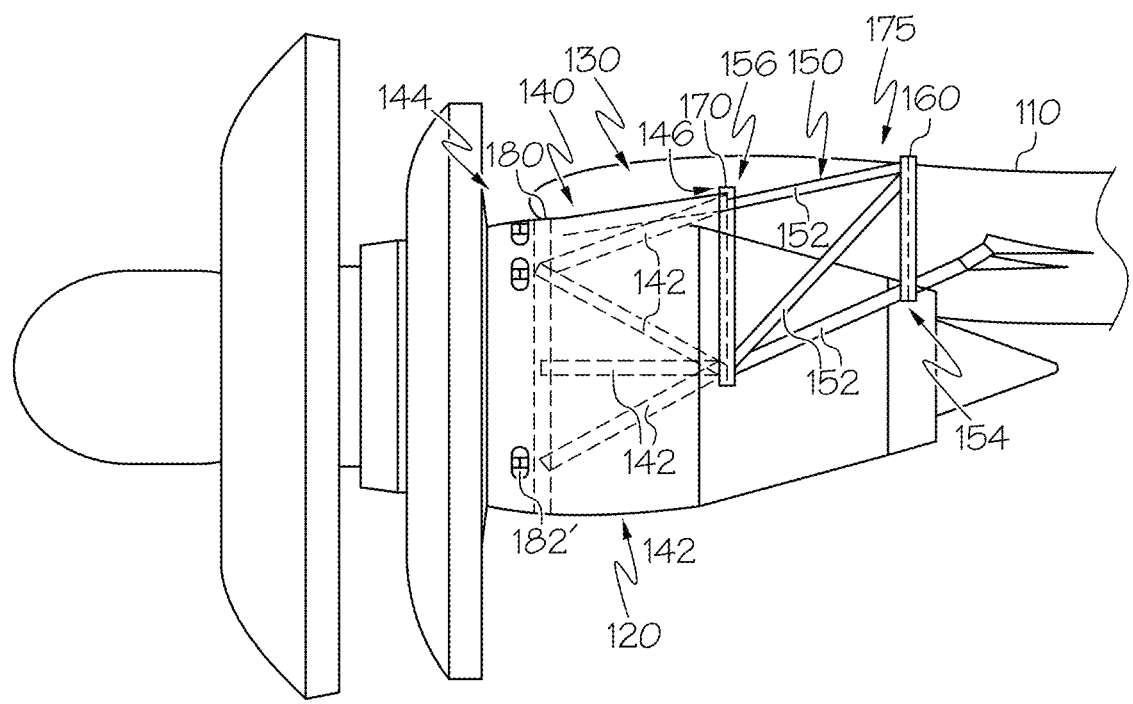
FIG. 1 is a side schematic of a strut assembly coupling an engine to a wing of an aircraft.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic, and/or operational step described in connection with the example is included in at least one aspect, embodiment, and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example. Moreover, the subject matter characterizing any one example may be, but is not necessarily, combined with the subject matter characterizing any other example.

Figure 12:
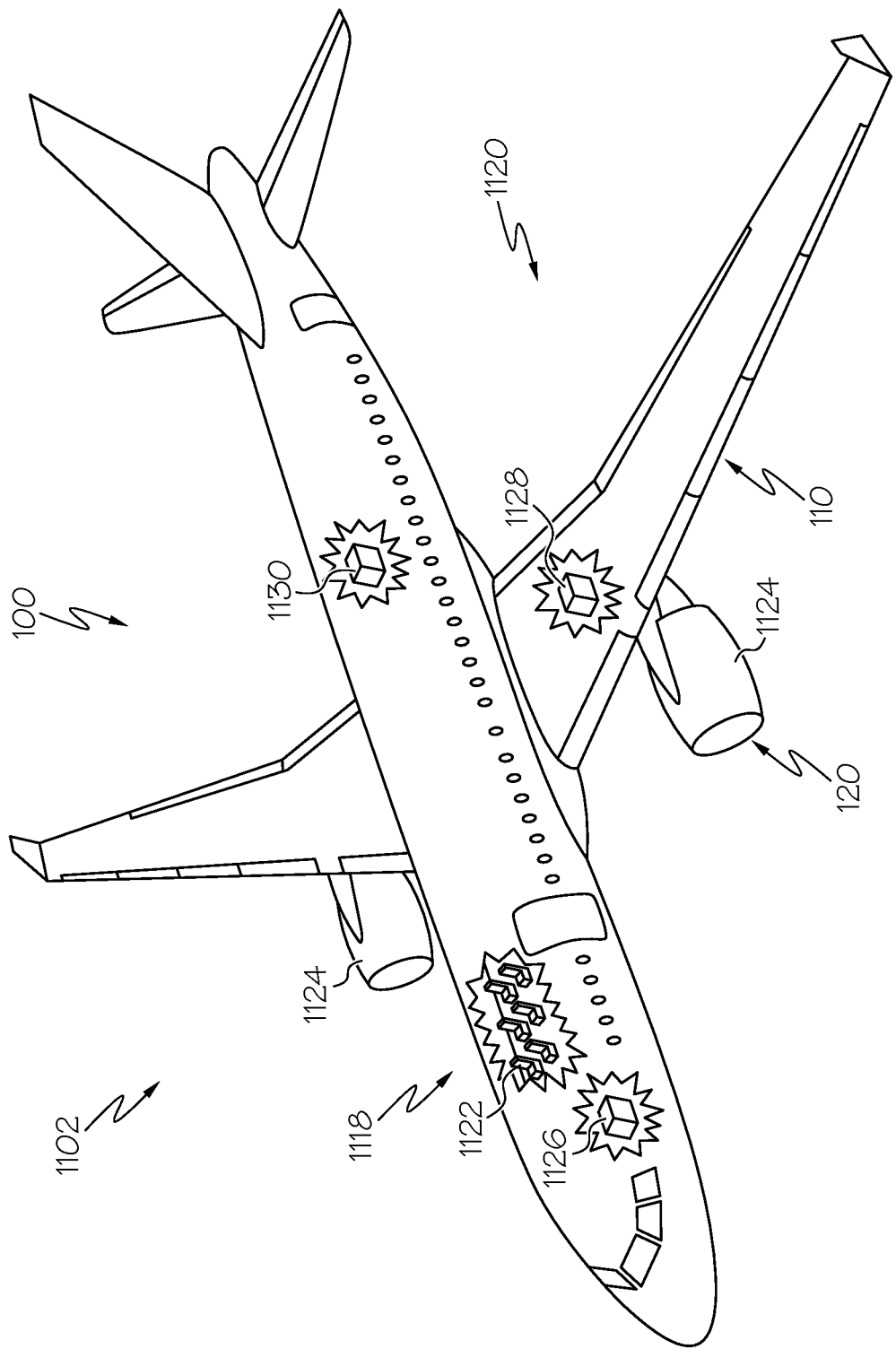
FIG. 12 is a schematic block diagram of an example of an aircraft.

Referring to FIG. 1-FIG. 5, disclosed is a strut assembly 130 for coupling an engine 120 to a wing 110 of an aircraft 100, FIG. 12. The strut assembly 130 may include a portion of a pylon 175. The strut assembly 130 may be configured to mount an unducted fan engine or an open rotor engine to a wing 110 of an aircraft 100. The strut assembly 130 may be configured to mount to one or two station planes on an engine 120, based upon mount vibration affects. Using the disclosed strut assembly 130, thrust can be reacted at or below an engine centerline, alleviating engine bending, and further allowing for lighter engines. The disclosed strut assembly 130 design may further allow movement up to 17.5" up as compared to convention strut to wing architectures.

In one example, the strut assembly 130 includes a mid truss assembly 140 having a fore portion 144 and an aft portion 146, see FIG. 1. In one or more examples, the mid truss assembly 140 may include a plurality of mid truss members 142. In one example, each mid truss member 142' of the plurality of mid truss members 142 is hollow. In another example, each mid truss member 142' of the plurality of mid truss members 142 is corrosion resistant. The pluratliy of mid truss members 142 may be of any material have requisite material properties for the strut assembly 130. In one example, each mid truss member 142' of the plurality of mid truss members 142 comprises a metallic material. In another example, each mid truss member 142' of the plurality of mid truss members 142 comprises steel. In another example, each mid truss member 142' of the plurality of mid truss members 142 comprises a titanium alloy. In another example, each mid truss member 142' of the plurality of mid truss members 142 comprises Ti-6Al-4V. In yet another example, each mid truss member 142' of the plurality of mid truss members 142 comprises Inconel. In yet a further example, each mid truss member 142' of the plurality of mid truss members 142 comprises Ti-6Al-2Sn-4Zr-2Mo.

Referring to FIG. 1, in one or more examples, the strut assembly 130 further includes an aft truss assembly 150 having a fore portion 156 and an aft portion 154. The fore portion 156 of the aft truss assembly 150 is connected to the aft portion 146 of the mid truss assembly 140. In one example, the aft truss assembly 150 comprises a plurality of aft truss members 152. In one example, each aft truss member 152' of the plurality of aft truss members 152 is hollow. In another example, each aft truss member 152' of the plurality of aft truss members 152 is corrosion resistant. The plurality of aft truss members 152 may be of any material have requisite material properties for the strut assembly 130. In one example, each aft truss member 152' of the plurality of aft truss members 152 comprises a metallic material. In another example, each aft truss member 152' of the plurality of aft truss members 152 comprises steel. In another example, each aft truss member 152' of the plurality of aft truss members 152 comprises a titanium alloy. In another example, each aft truss member 152' of the plurality of aft truss members 152 comprises Ti-6Al-4V. In yet another example, each aft truss member 152' of the plurality of aft truss members 152 comprises Inconel. In yet a further example, each aft truss member 152' of the plurality of aft truss members 152 comprises Ti-6Al-2Sn-4Zr-2Mo.

Figure 4:
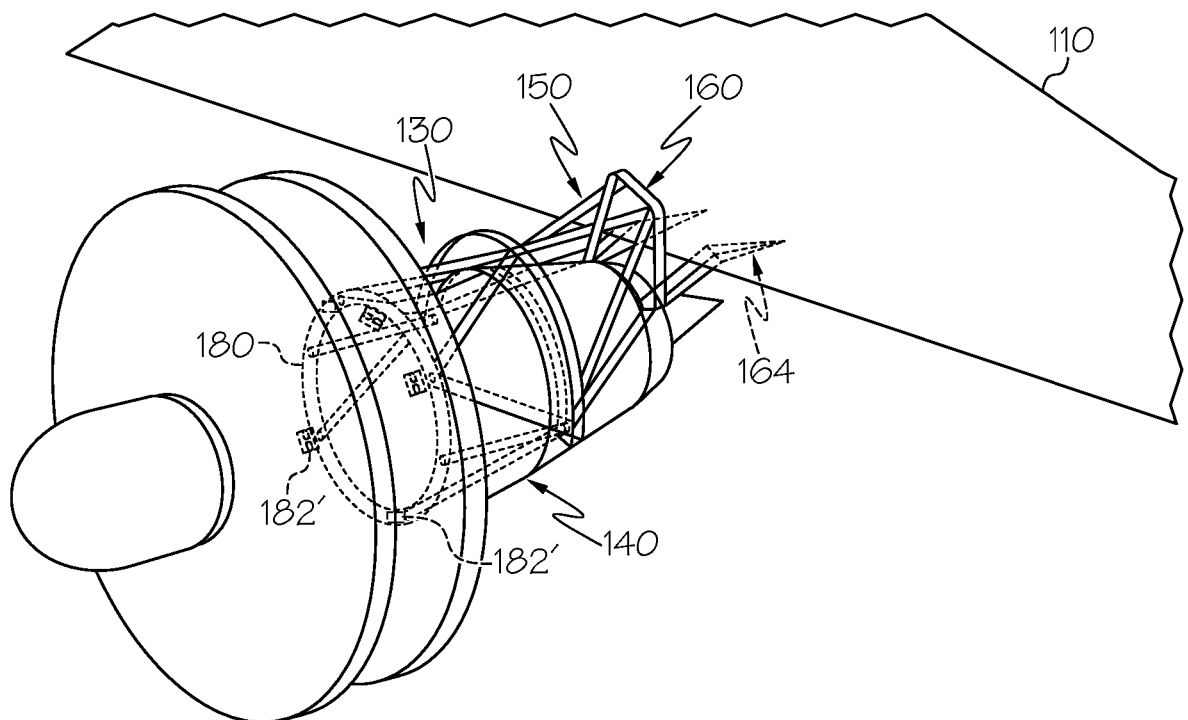
FIG. 4 is a perspective schematic of the strut assembly of FIG. 1.

Referring to FIG. 4, in one or more examples, the strut assembly 130 further includes an aft strut bulkhead 160 connected to the aft portion 154 of the aft truss assembly 150. In one example, the aft strut bulkhead 160 comprises a fireproof material and serves as an engine compartment firewall.

Referring to FIG. 4, in one or more examples, the strut assembly 130 further includes a wing mounting 164 feature operatively connected to, and located aft of, the aft strut bulkhead 160. The wing mounting feature 164 may be configured to couple with an outside surface of the wing 110. In one example, the wing mounting feature 164 may be configured to couple with a top surface of the wing 110.

The strut assembly 130 further includes an engine mount member 180 connected to the fore portion 144 of the mid truss assembly 140. The engine mount member 180 may be of any shape and configuration suitable for the aircraft 100, FIG. 12. In one example, the engine mount member 180 comprises a ring shape configured to fully encircle a portion of the engine 120 when the strut assembly 130 is connected to the engine 120. In another example, the engine mount member 180 comprises a half-ring shape configured to partially encircle a portion of the engine 120 when the strut assembly 130 is connected to the engine 120. In in yet another example, the engine mount member 180 comprises a plurality of engine mounting features 182. Each engine mounting feature 182' of the plurality of engine mounting features 182 may be configured to dampen vibration.

Figure 3:
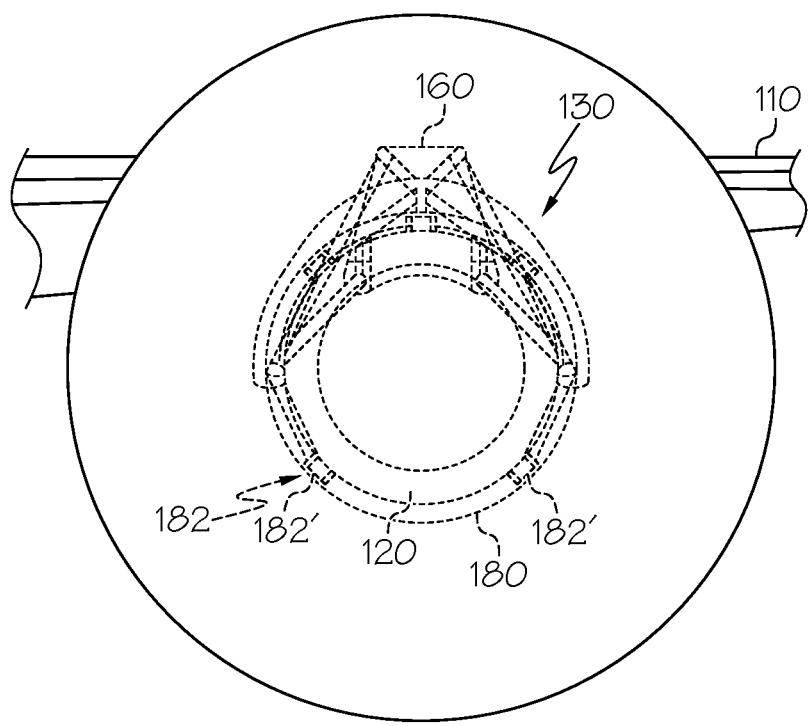
FIG. 3 is a front schematic of the strut assembly of FIG. 1.
Figure 5:
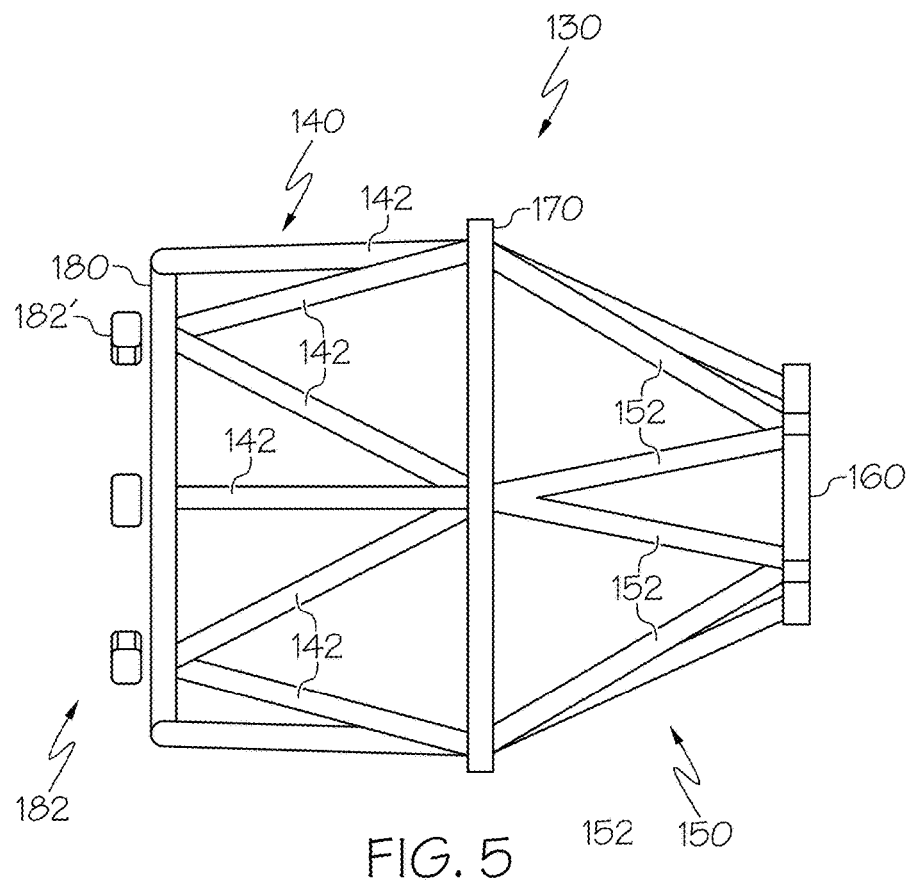
FIG. 5 is a top view schematic of the strut assembly of FIG. 1.
Figure 6:
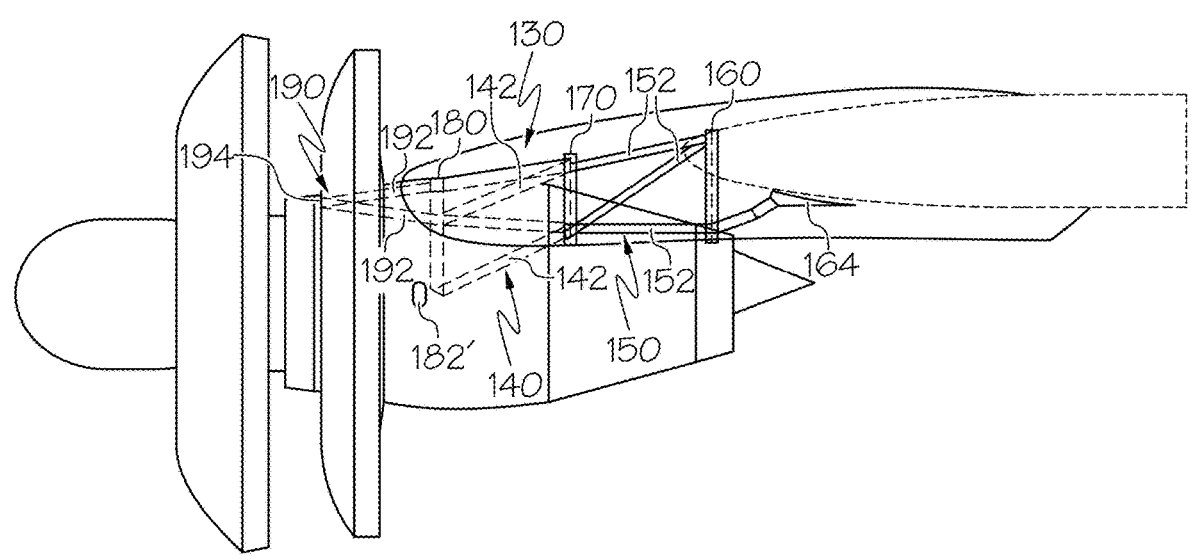
FIG. 6 is a side schematic of a strut assembly coupling an engine to a wing of an aircraft.
Figure 7:
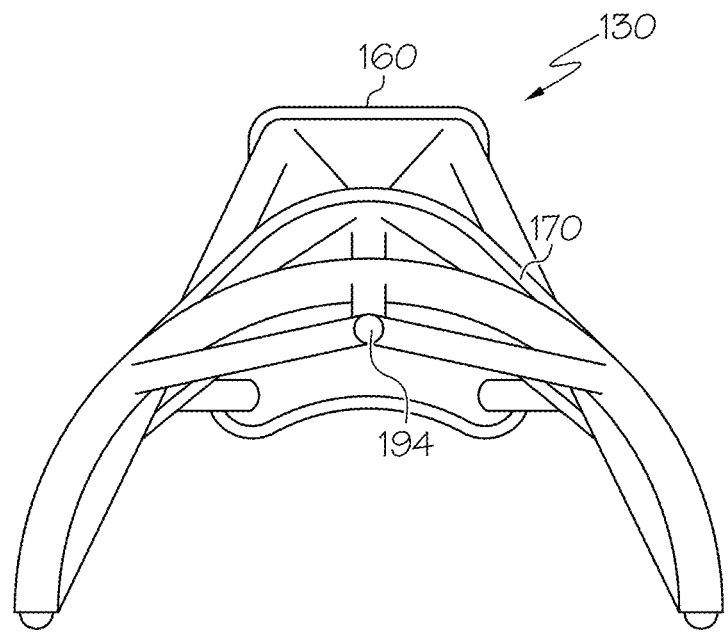
FIG. 7 is a front schematic of the strut assembly of FIG. 6.
Figure 8:
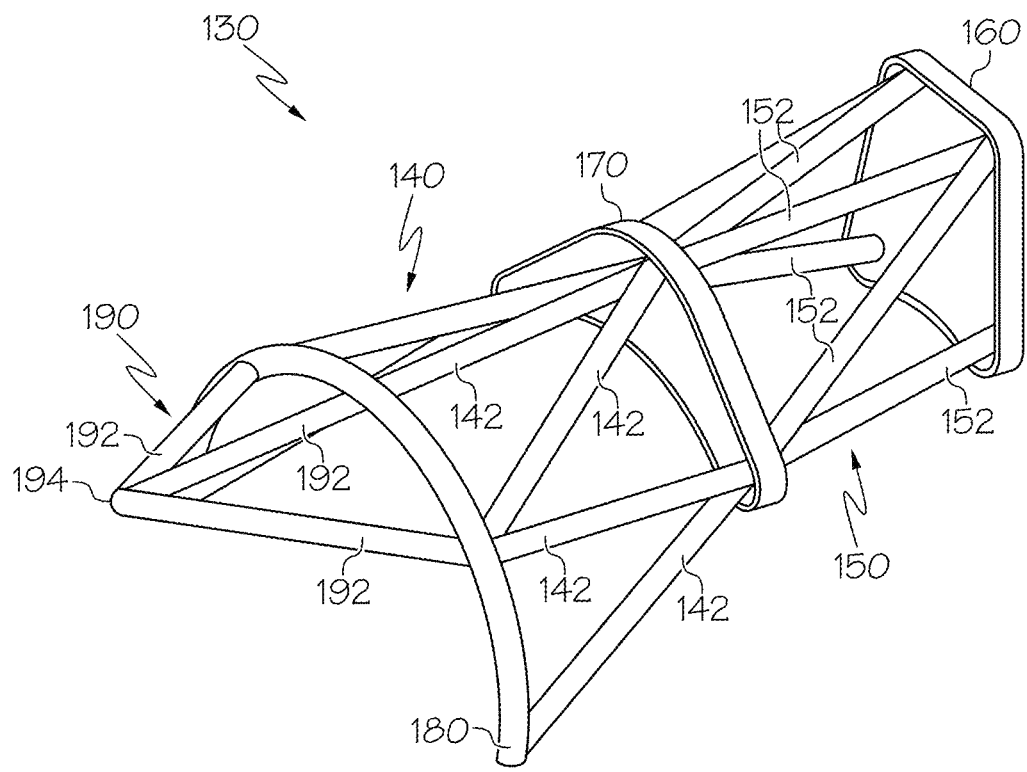
FIG. 8 is a perspective schematic of the strut assembly of FIG. 6.
Figure 9:
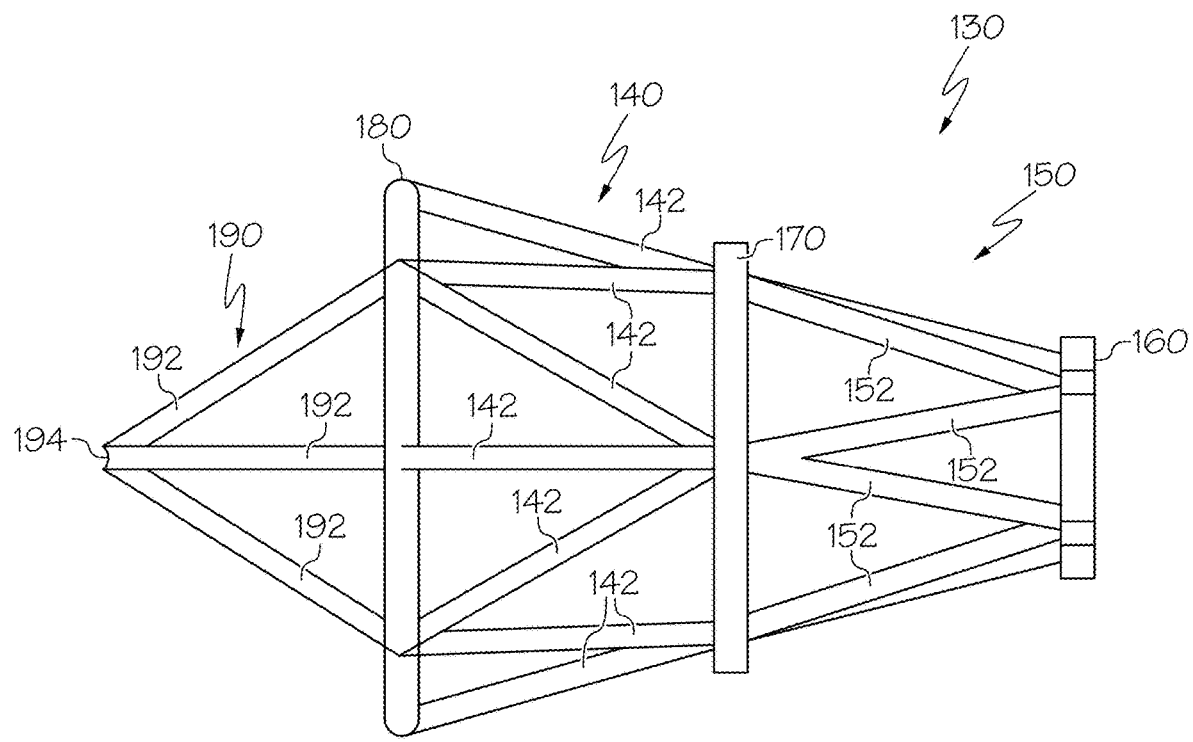
FIG. 9 is a top view schematic of the strut assembly of FIG. 6.

Referring to FIG. 3 and FIG. 5, in one or more examples, the strut assembly 130 further includes a mid strut bulkhead 170 between the aft truss assembly 150 and the mid truss assembly 140.

Referring to FIG. 6-FIG. 9, in one or more examples, the strut assembly 130 further includes a fore truss assembly 190 connected to the engine mount member 180. In one example, the fore truss assembly 190 includes a plurality of fore truss members 192. Still referring to FIG. 6, in one or more examples, the strut assembly 130 further comprising a fore engine mounting feature 194 connected to the fore truss assembly 190.

Referring to FIG. 12, disclosed is an aircraft 100. In one or more examples, the aircraft 100 includes a wing 110, an engine 120 located below the wing 110m and a strut assembly 130 coupling the engine 120 to the wing 110.

Referring to FIG. 1, the strut assembly 130 of the aircraft 100 includes a mid truss assembly 140 having a fore portion 144 and an aft portion 146. In one or more examples, the mid truss assembly 140 may include a plurality of mid truss members 142. In one example, each mid truss member 142' of the plurality of mid truss members 142 is hollow. In another example, each mid truss member 142' of the plurality of mid truss members 142 is corrosion resistant. The plurality of mid truss members 142 may be of any material have requisite material properties for the strut assembly 130. In one example, each mid truss member 142' of the plurality of mid truss members 142 comprises a metallic material. In another example, each mid truss member 142' of the plurality of mid truss members 142 comprises steel. In another example, each mid truss member 142' of the plurality of mid truss members 142 comprises a titanium alloy. In another example, each mid truss member 142' of the plurality of mid truss members 142 comprises Ti-6Al-4V. In yet another example, each mid truss member 142' of the plurality of mid truss members 142 comprises Inconel. In yet a further example, each mid truss member 142' of the plurality of mid truss members 142 comprises Ti-6Al-2Sn-4Zr-2Mo.

Referring to FIG. 1, the strut assembly 130 of the aircraft 100 includes an aft truss assembly 150 connected to the mid truss assembly 140. The aft truss assembly 150 may have a fore portion 156 and an aft portion 154. The fore portion 156 of the aft truss assembly 150 is connected to the aft portion 146 of the mid truss assembly 140. In one example, the aft truss assembly 150 comprises a plurality of aft truss members 152. In one example, each aft truss member 152' of the plurality of aft truss members 152 is hollow. In another example, each aft truss member 152' of the plurality of aft truss members 152 is corrosion resistant. The pluratliy of aft truss members 152 may be of any material have requisite material properties for the strut assembly 130. In one example, each aft truss member 152' of the plurality of aft truss members 152 comprises a metallic material. In another example, each aft truss member 152' of the plurality of aft truss members 152 comprises steel. In another example, each aft truss member 152' of the plurality of aft truss members 152 comprises a titanium alloy. In another example, each aft truss member 152' of the plurality of aft truss members 152 comprises Ti-6Al-4V. In yet another example, each aft truss member 152' of the plurality of aft truss members 152 comprises Inconel. In yet a further example, each aft truss member 152' of the plurality of aft truss members 152 comprises Ti-6Al-2Sn-4Zr-2Mo.

Referring to FIG. 4, the strut assembly 130 of the aircraft 100 includes an aft strut bulkhead 160 connected to the aft portion 154 of the aft truss assembly 150. In one example, the aft strut bulkhead 160 comprises a fireproof material. The aft strut bulkhead 160 may further serve as an engine compartment firewall.

Referring to FIG. 4, the strut assembly 130 of the aircraft 100 includes wing mounting features 164 located aft of the aft strut bulkhead 160. The wing mounting feature 164 may be configured to couple with an outside surface of the wing 110. In one example, the wing mounting feature 164 may be configured to couple with a top surface of the wing 110.

Figure 2:
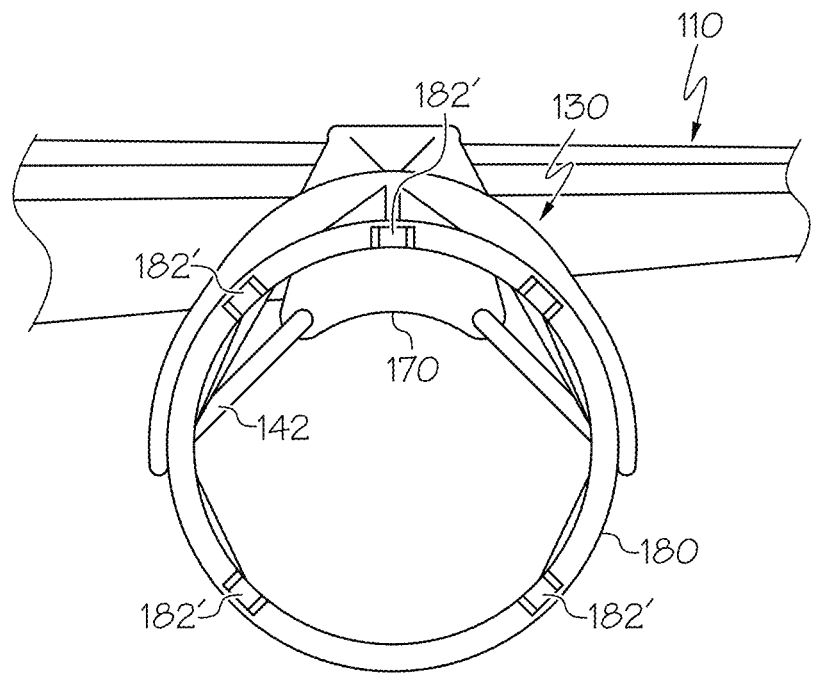
FIG. 2 is a front schematic of the strut assembly of FIG. 1.

Referring to FIG. 2, in one or more examples, the strut assembly 130 of the aircraft 100 further includes an engine mount member 180 connected to a fore portion 144 of the mid truss assembly 140. The engine mount member 180 may be of any shape and configuration suitable for the aircraft 100. In one example, the engine mount member 180 comprises a ring shape configured to fully encircle a portion of the engine 120 when the strut assembly 130 is connected to the engine 120. In another example, the engine mount member 180 comprises a half-ring shape configured to partially encircle a portion of the engine 120 when the strut assembly 130 is connected to the engine 120. In in yet another example, the engine mount member 180 comprises a plurality of engine mounting features 182. Each engine mounting feature 182' of the plurality of engine mounting features 182 may be configured to dampen vibration.

Referring to FIG. 3, in one or more examples, the strut assembly 130 of the aircraft 100 further includes a mid strut bulkhead 170 located between the aft truss assembly 150 and the mid truss assembly 140. The strut assembly 130 of the aircraft 100 may further include a pylon 175 located between the wing 110 and the engine 120 of the aircraft 100. In one example, the strut assembly 130 defines a portion of the pylon 175.

Referring to FIG. 6-FIG. 9, in one or more examples, the strut assembly 130 of the aircraft 100 further includes a fore truss assembly 190 connected to the engine mount member 180. In one example, the fore truss assembly 190 comprises a plurality of fore truss members 192. The strut assembly 130 of the aircraft 100 may further include a fore engine mounting feature 194 connected to the fore truss assembly 190.

Figure 10:
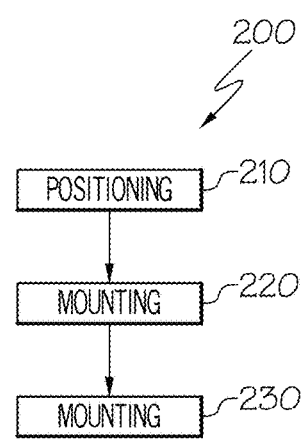
FIG. 10 is a flow chart of a method for coupling an engine to a wing of an aircraft.

Referring to FIG. 10, disclosed is a method 200 for connecting an engine 120 to a wing 110 of an aircraft 100. In one or more examples, the method 200 includes positioning 210 a strut assembly 130 between the engine 120 and the wing 110. In one example, the strut assembly 130 includes a fore truss assembly 190. The fore truss assembly 190 may include a plurality of fore truss members 192. The strut assembly 130 of the method 200 may further include a fore engine mounting feature 194 connected to the fore truss assembly 190.

Referring to FIG. 1, in one or more examples, the strut assembly 130 of the method 200 includes a mid truss assembly 140 connected to the fore truss assembly 190. The mid truss assembly 140 may include a plurality of mid truss members 142. In one example, each mid truss member 142' of the plurality of mid truss members 142 is hollow. In another example, each mid truss member 142' of the plurality of mid truss members 142 is corrosion resistant. The pluratliy of mid truss members 142 may be of any material have requisite material properties for the strut assembly 130. In one example, each mid truss member 142' of the plurality of mid truss members 142 comprises a metallic material. In another example, each mid truss member 142' of the plurality of mid truss members 142 comprises steel. In another example, each mid truss member 142' of the plurality of mid truss members 142 comprises a titanium alloy. In another example, each mid truss member 142' of the plurality of mid truss members 142 comprises Ti-6Al-4V. In yet another example, each mid truss member 142' of the plurality of mid truss members 142 comprises Inconel. In yet a further example, each mid truss member 142' of the plurality of mid truss members 142 comprises Ti-6Al-2Sn-4Zr-2Mo.

Referring to FIG. 1, in one or more examples, the strut assembly 130 of the method 200 includes an aft truss assembly 150 connected to the mid truss assembly 140. The aft truss assembly 150 may include a plurality of aft truss members 152. In one example, each aft truss member 152' of the plurality of aft truss members 152 is hollow. In another example, each aft truss member 152' of the plurality of aft truss members 152 is corrosion resistant. The pluratliy of aft truss members 152 may be of any material have requisite material properties for the strut assembly 130. In one example, each aft truss member 152' of the plurality of aft truss members 152 comprises a metallic material. In another example, each aft truss member 152' of the plurality of aft truss members 152 comprises steel. In another example, each aft truss member 152' of the plurality of aft truss members 152 comprises a titanium alloy. In another example, each aft truss member 152' of the plurality of aft truss members 152 comprises Ti-6Al-4V. In yet another example, each aft truss member 152' of the plurality of aft truss members 152 comprises Inconel. In yet a further example, each aft truss member 152' of the plurality of aft truss members 152 comprises Ti-6Al-2Sn-4Zr-2Mo.

Referring to FIG. 4, in one or more examples, the strut assembly 130 of the method 200 includes an aft strut bulkhead 160 connected to the aft portion 154 of the aft truss assembly 150. In one example, the aft strut bulkhead 160 is fireproof.

Referring to FIG. 4, in one or more examples, the strut assembly 130 of the method 200 includes wing mounting features 164 located aft of the aft strut bulkhead 160. and an engine mount member 180 connected to the fore truss assembly 190. The wing mounting feature 164 may be configured to couple with an outside surface of the wing 110. In one example, the wing mounting feature 164 may be configured to couple with a top surface of the wing 110.

Referring to FIG. 10, in one or more examples, the method 200 further includes mounting 220 the strut assembly 130 to the engine 120 and mounting 230 the strut assembly 130 to the wing 110 of the aircraft 100. The mounting 220 may include coupling the engine mount member 180 to the engine 120 with the plurality of engine mounting features 182. The engine mount member 180 may be of any shape and configuration suitable for the aircraft 100. In one example, the engine mount member 180 comprises a ring shape configured to fully encircle a portion of the engine 120 when the strut assembly 130 is connected to the engine 120. In another example, the engine mount member 180 comprises a half-ring shape configured to partially encircle a portion of the engine 120 when the strut assembly 130 is connected to the engine 120. In in yet another example, the engine mount member 180 comprises a plurality of engine mounting features 182. Each engine mounting feature 182' of the plurality of engine mounting features 182 may be configured to dampen vibration.

Referring to FIG. 5, in one or more example, the strut assembly 130 of the method 200 further includes a mid strut bulkhead 170 located between the aft truss assembly 150 and the mid truss assembly 140.

Other benefits of the disclosed strut assembly 130 include reduction in back pressure to the fan, allowance for lower total wetted area (total surface area exposed) for engine 120, pylon 175 and wing 110, reduction in engine 120 bending due to thrust, pitch and yaw, engine 120 fire compartment firewall simplification, increased volume available for systems routing and systems integration, architecture versatility, allowance for multiple engine mounting architectures, engine mounting architecture can be tailored to enhance engine aspects such as: SFC, spatial integration, engine vibration isolation for cabin environment, allowance for optimum engine placement for either a high or low wing aircraft 100, and locating the engine centerline closer to the wing 110, allowing for less landing gear growth for fan blade tip clearance to ground.

In one aspect, the strut assembly 130 has a gradual increase in cross sectional area, which aids in reduction of back-pressure variation on the engine fan. This design further improves engine fan efficiency and reduces fuel burn, vibration, and noise. The disclosed strut assembly 130 further allows for a fairing shape that has lower total wetted area (total surface area exposed) for the aircraft, providing reduced drag. The disclosed strut assembly 130 may have an open truss-type cradle design without using a typical strut box design that allows the space to be used for system routing. Further benefits of the disclosed design include aerodynamics as the proposed strut assembly 130 allows for improved aerodynamics based upon engine configuration. Additionally, the strut assembly 130 includes an aft bulkhead that acts as a firewall to prevent fires from propagating to the rest of the aircraft, simplifying fire safety methodology and further isolating vibration within the aircraft.

Figure 11:
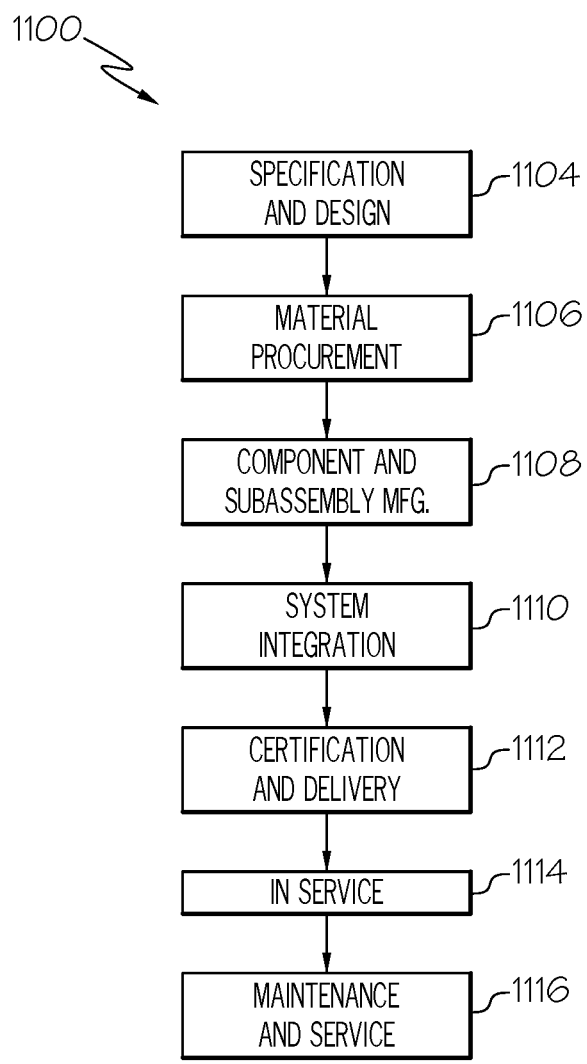
FIG. 11 is a flow diagram of an aircraft manufacturing and service methodology.

Examples of the present disclosure may be described in the context of aircraft manufacturing and service method 1100 as shown in FIG. 11 and aircraft 1102 as shown in FIG. 12. During pre-production, service method 1100 may include specification and design (block 1104) of aircraft 1102 and material procurement (Block 1106). During production, component and subassembly manufacturing (Block 1108) and system integration (Block 1110) of aircraft 1102 may take place. Thereafter, aircraft 1102 may go through certification and delivery (Block 1112) to be placed in service (Block 1114). While in service, aircraft 1102 may be scheduled for routine maintenance and service (Block 1116). Routine maintenance and service may include modification, reconfiguration, refurbishment, etc. of one or more systems of aircraft 1102.

Each of the processes of service method 1100 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 12, aircraft 1102 produced by service method 1100 may include airframe 1118 with a plurality of high-level systems 1120 and interior 1122. Examples of high-level systems 1120 include one or more of propulsion system 1124, electrical system 1126, hydraulic system 1128, and environmental system 1130. Any number of other systems may be included. Although an aerospace example is shown, the principles disclosed herein may be applied to other industries, such as the automotive industry. Accordingly, in addition to aircraft 1102, the principles disclosed herein may apply to other vehicles, e.g., land vehicles, marine vehicles, space vehicles, etc.

Strut assembly (ies), aircraft, and method(s) shown or described herein may be employed during any one or more of the stages of the manufacturing and service method 1100. For example, components or subassemblies corresponding to component and subassembly manufacturing (block 1108) may be fabricated or manufactured in a manner similar to components or subassemblies produced while aircraft 1102 is in service (Block 1114). Also, one or more examples of the strut assembly (ies), aircraft, and method(s), or combination thereof may be utilized during production stages component and subassembly manufacturing (Block 1108) and system integration (Block 1110), for example, by substantially expediting assembly of or reducing the cost of aircraft 1102. Similarly, one or more examples of the system or method realizations, or a combination thereof, may be utilized, for example and without limitation, while aircraft 1102 is in service (Block 1114) and/or during maintenance and service (Block 1116).

Different examples of the strut assembly (ies), aircraft, and method(s) disclosed herein include a variety of components, features, and functionalities. It should be understood that the various examples of the strut assembly (ies), aircraft, and method(s) disclosed herein may include any of the components, features, and functionalities of any of the other examples of the strut assembly (ies), aircraft, and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A strut assembly for coupling an engine to a wing of an aircraft, the strut assembly comprising:
   a mid strut bulkhead;
   an engine mount member spaced away from the mid strut bulkhead;
   an aft strut bulkhead spaced away from the mid strut bulkhead, opposite the engine mount member;

a mid truss assembly comprising:
  a central mid truss member extending between the mid strut bulkhead and the engine mount member;
  an inboard mid truss member extending between the mid strut bulkhead and the engine mount member; and
  an outboard mid truss member extending between the mid strut bulkhead and the engine mount member;
  wherein the central mid truss member, the inboard mid truss member, and the outboard mid truss member diverge in a forward direction from the mid strut bulkhead to the engine mount member;
an aft truss assembly extending between the mid strut bulkhead and the aft strut bulkhead;
a wing mounting feature operatively connected to, and located aft of, the aft strut bulkhead;
a fore truss assembly consisting essentially of:
  a central fore truss member positioned at an upper center of the engine mount member and extending forward from the engine mount member and aligned with the central mid truss member;
  an inboard fore truss member angularly spaced away from the central fore truss member along the engine mount member and extending forward from the engine mount member; and
  an outboard fore truss member angularly spaced away from the central fore truss member along the engine mount member, opposite the inboard fore truss member, and extending forward from the engine mount member,
  wherein the central fore truss member, the inboard fore truss member, and the outboard fore truss member converge in a forward direction from the engine mount member to a forward node, opposite the engine mount member, that forms a terminus of a fore portion of the fore truss assembly;
an inboard engine mounting feature coupled directly to the engine mount member and angularly spaced away from the inboard fore truss member, opposite the central fore truss member, along the engine mount member;
an outboard engine mounting feature coupled directly to the engine mount member and angularly spaced away from the outboard fore truss member, opposite the central fore truss member, along the engine mount member; and
a fore engine mounting feature coupled directly to the fore truss assembly, positioned at the forward node of the fore truss assembly, and aligned with the central fore truss member.

2. The strut assembly of claim 1, wherein the engine mount member comprises a half-ring shape configured to partially encircle a portion of the engine when the strut assembly is connected to the engine.

3. The strut assembly of claim 1, wherein the aft strut bulkhead comprises a fireproof material.

4. The strut assembly of claim 1, wherein the mid truss assembly further comprises additional mid truss members extending between the mid strut bulkhead and the engine mount member.

5. The strut assembly of claim 4, wherein each mid truss member of the mid truss assembly is hollow.

6. The strut assembly of claim 4, wherein each mid truss member of the mid truss assembly is corrosion resistant.

7. The strut assembly of claim 4, wherein each mid truss member of the mid truss assembly comprises a metallic material.

8. The strut assembly of claim 4, wherein each mid truss member of the mid truss assembly comprises one or more of a steel material, a titanium alloy, Ti-6Al-4V, and Ti-6Al-2Sn-4Zr-2Mo.

9. The strut assembly of claim 1, wherein the aft truss assembly comprises a plurality of aft truss members.

10. The strut assembly of claim 9, wherein each aft truss member of the aft truss assembly is hollow.

11. The strut assembly of claim 9, wherein each aft truss member of the aft truss assembly is corrosion resistant.

12. The strut assembly of claim 9, wherein each aft truss member of the aft truss assembly comprises a metallic material.

13. The strut assembly of claim 1, wherein the inboard engine mounting feature, the outboard engine mounting feature, and the fore engine mounting feature are configured to dampen vibrations.

14. An aircraft comprising:
a wing;
an engine located below the wing; and
a strut assembly coupling the engine to the wing, the strut assembly comprising:
  a mid strut bulkhead;
  an engine mount member spaced away from the mid strut bulkhead;
  an aft strut bulkhead spaced away from the mid strut bulkhead, opposite the engine mount member;
  a mid truss assembly comprising:
    a central mid truss member extending between and connected to the mid strut bulkhead and the engine mount member;
    an inboard mid truss member extending between and connected to the mid strut bulkhead and the engine mount member; and
    an outboard mid truss member extending between and connected to the mid strut bulkhead and the engine mount member;
    wherein the central mid truss member, the inboard mid truss member, and the outboard mid truss member diverge in a forward direction from the mid strut bulkhead to the engine mount member;
  an aft truss assembly extending between and connected to the mid strut bulkhead and the aft strut bulkhead;
  wing mounting features connected to and located aft of the aft strut bulkhead;
  a fore truss assembly consisting essentially of:
    a central fore truss member positioned at an upper center of the engine mount member and extending forward from the engine mount member and aligned with the central mid truss member;
    an inboard fore truss member angularly spaced away from the central fore truss member along the engine mount member and extending forward from the engine mount member; and
    an outboard fore truss member angularly spaced away from the central fore truss member along the engine mount member, opposite the inboard fore truss member, and extending forward from the engine mount member,
    wherein the central fore truss member, the inboard fore truss member, and the outboard fore truss member converge in a forward direction from the engine mount to a forward node, opposite the engine mount member, that forms a terminus of a fore portion of the fore truss assembly;
  an inboard engine mounting feature coupled directly to the engine mount member and angularly spaced away from the inboard fore truss member, opposite the central fore truss member, along the engine mount member;
an outboard engine mounting feature coupled directly to the engine mount member and angularly spaced away from the outboard fore truss member, opposite the central fore truss member, along the engine mount member; and
a fore engine mounting feature coupled directly to the fore truss assembly, positioned at the forward node of the fore truss assembly, and aligned with the central fore truss member.

15. The aircraft of claim 14, wherein the inboard engine mounting feature, the outboard engine mounting feature, and the fore engine mounting feature are configured to dampen vibrations from the engine.

16. The aircraft of claim 14, wherein the engine mount member comprises a half-ring shape configured to partially encircle a portion of the engine when the strut assembly is connected to the engine.

17. A method for connecting an engine to a wing of an aircraft, the method comprising:
positioning a strut assembly between the engine and the wing, the strut assembly comprising:
a mid strut bulkhead;
an engine mount member spaced away from the mid strut bulkhead;
an aft strut bulkhead spaced away from the mid strut bulkhead, opposite the engine mount member;
a mid truss assembly comprising:
a central mid truss member extending between the mid strut bulkhead and the engine mount member;
an inboard mid truss member extending between the mid strut bulkhead and the engine mount member; and
an outboard mid truss member extending between the mid strut bulkhead and the engine mount member;
wherein the central mid truss member, the inboard mid truss member, and the outboard mid truss member diverge in a forward direction from the mid strut bulkhead to the engine mount member;
an aft truss assembly connected to and extending between the mid strut bulkhead and the aft strut bulkhead;
wing mounting features connected to and located aft of the aft strut bulkhead; and
a fore truss assembly consisting essentially of:
a central fore truss member positioned at an upper center of the engine mount member and extending forward from the engine mount member and aligned with the central mid truss member;
an inboard fore truss member angularly spaced away from the central fore truss member along the engine mount member and extending forward from the engine mount member; and
an outboard fore truss member angularly spaced away from the central fore truss member along the engine mount member, opposite the inboard fore truss member, and extending forward from the engine mount member,
wherein the central fore truss member, the inboard fore truss member, and the outboard fore truss member converge in a forward direction from the engine mount to a forward node, opposite the engine mount member, that forms a terminus of a fore portion of the fore truss assembly;
an inboard engine mounting feature coupled directly to the engine mount member and angularly spaced away from the inboard fore truss member, opposite the central fore truss member, along the engine mount member;
an outboard engine mounting feature coupled directly to the engine mount member and angularly spaced away from the outboard fore truss member, opposite the central fore truss member, along the engine mount member; and
a fore engine mounting feature coupled to the fore truss assembly, positioned at the forward node of the fore truss assembly, and aligned with the central fore truss member;
coupling the strut assembly to the wing; and
coupling the strut assembly to the engine at the inboard engine mounting feature, the outboard engine mounting feature, and the fore engine mounting feature.

18. The method of claim 17, further comprising damping vibrations from the engine using the inboard engine mounting feature, the outboard engine mounting feature, and the fore engine mounting feature.

19. The strut assembly of claim 14, wherein each mid truss member of the mid truss assembly and each aft truss member of the aft truss assembly is hollow.

* * * * *